United States Patent
Aguilar-Armijo et al.

(10) Patent No.: US 11,968,245 B2
(45) Date of Patent: Apr. 23, 2024

(54) ADAPTIVE BITRATE ALGORITHM DEPLOYED AT EDGE NODES

(71) Applicant: BITMOVIN, INC., San Francisco, CA (US)

(72) Inventors: Jesús Aguilar-Armijo, Klagenfurt am Wörthersee (AT); Ekrem Çetinkaya, Klagenfurt am Wörthersee (AT); Hermann Hellwagner, Klagenfurt am Wörthersee (AT); Christian Timmerer, Klagenfurt am Wörthersee (AT)

(73) Assignee: BITMOVIN, INC., San Francisco, CA (US)

(*) Notice: Subject to any disclaimer, the term of this patent is extended or adjusted under 35 U.S.C. 154(b) by 0 days.

(21) Appl. No.: 17/895,749

(22) Filed: Aug. 25, 2022

(65) Prior Publication Data

US 2023/0061526 A1 Mar. 2, 2023

Related U.S. Application Data

(60) Provisional application No. 63/237,641, filed on Aug. 27, 2021.

(51) Int. Cl.
*G06F 13/00* (2006.01)
*H04L 65/612* (2022.01)
(Continued)

(52) U.S. Cl.
CPC .......... *H04L 65/612* (2022.05); *H04L 65/756* (2022.05); *H04L 65/80* (2013.01); *H04W 4/18* (2013.01)

(58) Field of Classification Search
CPC ..... H04L 65/612; H04L 65/756; H04L 65/80; H04L 65/765; H04W 4/18
(Continued)

(56) References Cited

U.S. PATENT DOCUMENTS

| | | | |
|---|---|---|---|
| 8,054,826 B2 * | 11/2011 | Cheng | H04L 47/2416 370/335 |
| 8,570,438 B2 * | 10/2013 | Bhaskaran | H04N 21/4382 348/554 |

(Continued)

OTHER PUBLICATIONS

Bentaleb et al., "A Survey on Bitrate Adaptation Schemes for Streaming Media Over HTTP,", IEEE Communications Surveys & Tutorials, vol. 21, No. 1, 2019, pp. 562-585.
(Continued)

*Primary Examiner* — Kenneth R Coulter
(74) *Attorney, Agent, or Firm* — Marton Ribera Schumann & Chang LLP; Chien-Ju Alice Chuang; Hector J. Ribera

(57) ABSTRACT

The technology described herein relates to implementing an adaptive bitrate (ABR) algorithm at edge nodes. A method for implementing an ABR algorithm at an edge node may include receiving at the edge node a request for a video segment from a client according to the client's ABR algorithm, the request indicating a quality. A weighted sum score for each of a set of qualities may be computed based on a quality score and a fairness score using the ABR algorithm at the edge node, the qualities including at least the requested quality and another quality. A modified request may be generated in response to the weighted sum score for the other quality being better than the weighted sum score for the requested quality. The modified request may be sent to a server. The video segment in the other quality may be received from the server and provided to a client.

17 Claims, 7 Drawing Sheets

(51) Int. Cl.
*H04L 65/756* (2022.01)
*H04L 65/80* (2022.01)
*H04W 4/18* (2009.01)

(58) Field of Classification Search
USPC .................. 709/231–235, 203, 227–229
See application file for complete search history.

(56) References Cited

U.S. PATENT DOCUMENTS

| | | | |
|---|---|---|---|
| 10,069,885 B2* | 9/2018 | Dasher .................. | H04L 65/80 |
| 10,104,413 B2* | 10/2018 | Phillips ............ | H04N 21/23605 |
| 2007/0025264 A1* | 2/2007 | Cheng .................... | H04L 65/80 |
| | | | 370/252 |
| 2010/0265334 A1* | 10/2010 | Bhaskaran ............. | H04N 19/61 |
| | | | 348/180 |
| 2018/0014050 A1* | 1/2018 | Phillips .............. | H04N 21/6373 |

OTHER PUBLICATIONS

Jain et al., "Throughput Fairness Index: An Explaination", 1984, pp. -13.
Mehrabi et al., "Edge Computing Assisted Adaptive Mobile Video Streaming", IEE Transactions on Mobile Computing, vol. 18, No. 4, Apr. 2019, pp. 787-800.
Lederer et al., "Dynamic Adaptive Streaming over HTTP Dataset", Proceedings of the 3rd Multimedia Systems Conference, Feb. 2012, pp. 89-94.
Ericsson, "Ericsson Mobility Report", Nov. 2019, pp. 1-36.
ETSI, "Mobile Edge Computing A Key Technology Towards 5G", ETSI White Paper No. 11, Sep. 2015, pp. 1-16.
Nguyen et al., "Adaptation Method for Video Streaming over HTTP/2", IEICE Communications Express Comex, vol. 1, pp. 1-6, publication/292213198_Adaptation_Method_for_Video_Streaming_over_HTTP2), 2016.
3GPP "3GPP TS 26.247. Progressive Download and Dynamic Adaptive Streaming over Http (3GP-DASH)", 2015, pp. 1.

* cited by examiner

ADAPTIVE BITRATE ALGORITHM DEPLOYED AT EDGE NODES

CROSS-REFERENCE TO RELATED APPLICATIONS

The present applications claims priority to U.S. Provisional Patent Application No. 63/237,641 entitled "Adaptive Bitrate Algorithm Deployed at Edge Nodes," filed Aug. 27, 2021, the contents of which are hereby incorporated by reference in their entirety.

BACKGROUND OF INVENTION

Video streaming traffic accounts for the biggest data share within mobile networks. It is gaining an ever-increasing share of the mobile network traffic and is expected to be over 75% of mobile network traffic by 2025. Therefore, proper delivery of video streaming content becomes very important.

Adaptive bitrate (ABR) algorithms, such as HTTP Adaptive Streaming (HAS), emerged to improve the performance of video streaming services. HAS consists of dividing the video into different individual segments, each encoded in different qualities. HAS enables better performance, as the client determines which segment quality to request, adapting to the current network conditions. The decision of which quality to request is not trivial. For that purpose, many ABR algorithms have been presented in the literature. ABR algorithms are designed to choose which segment quality to request depending on the client's context. There are multiple bitrate adaptation schemes in this area that can be classified into four categories: (1) client-based adaptation, (2) server-based adaptation, (3) network-assisted adaptation, and (4) hybrid adaptation. Most of the existing ABR algorithms follow the client-based adaptation scheme. On the one hand, one of the most significant advantages of this approach is scalability, as the processing is handled separately in each device. On the other hand, the client algorithms are independent, i.e., they are not aware of what other clients are requesting, which can lead to unfairness.

Conventional approaches, such as Fair In-Network Enhanced Adaptive Streaming (FINEAS), provide a HAS heuristic capable of adapting to current network conditions. However, this approach requires multiple coordination proxies located at different points of the network architecture. Another proactive and reactive QoE-based approach deployed in a proxy close to a base station that attempts to maximize overall network utility and optimize transmission rates for mobile DASH clients based on their buffer levels. However, the resource allocation at the base station can be problematic for this approach because it is out of control of applications deployed at the edge computing node, multiple radio link variables are involved, and it is shared between different types of traffic. Another hybrid edge and client adaptation framework for HAS uses a channel estimation scheme to improve adaptation to future radio network conditions using the Channel Quality Indicator (CQI) and attempts to optimize the joint adaptation. These existing optimization models can be problematic as clients are not synchronized—the segment requests are not performed simultaneously and may have different segment durations—thus there may be delays imposed by the time slot during which segment requests for all the video streaming clients are being collected.

Thus, it is desirable to have an on-the-fly ABR deployed at edge nodes.

BRIEF SUMMARY

The present disclosure provides for techniques relating to deploying an adaptive bitrate algorithm at edge nodes. A method for implementing an adaptive bitrate (ABR) algorithm at an edge node, may include: receiving at the edge node a request for a video segment from a client according to a client ABR algorithm, the request indicating a requested quality; computing a weighted sum score for each of a plurality of qualities based on a quality score and a fairness score using the ABR algorithm at the edge node, the plurality of qualities including at least the requested quality and another quality; generating a modified request in response to the weighted sum score for the other quality being better than the weighted sum score for the requested quality, the modified request being for a representation of the video segment in the other quality; and sending the modified request to a server. In some examples, the method also includes prefetching from the server a next video segment in two or more qualities. In some examples, the two or more qualities comprise a quality above the other quality and a quality below the other quality.

In some examples, the quality score is based on a quality weighting factor, the quality weighting factor predetermined based on a desired quality and desired fairness. In some examples, the quality weighting factor is higher if the desired quality is greater than the desired fairness. In some examples, the quality weighting factor is lower if the desired fairness is greater than the desired quality. In some examples, the server is configured to connect to a content delivery network, the content delivery network configured to receive the modified request from, and provide the video segment to, the edge node. In some examples, computing the weighted sum score comprises the ABR algorithm at the edge node estimating a future buffer value and to compare the future buffer value with a safe buffer value for each of the plurality of qualities. In some examples, the fairness index represents a desired fairness level for a group of clients, the group of clients having similar characteristics.

In some examples, the method also includes receiving the representation of the video segment in the other quality. In some examples, the method also includes sending the representation of the video segment in the other quality to the client. In some examples, the method also includes comprising checking the client's buffer. In some examples, the client comprises a media playback device. In some examples, the client is a mobile device.

A system for implementing an adaptive bitrate (ABR) algorithm at an edge node, may include: a memory comprising non-transitory computer-readable storage medium configured to store at least a set of bitrates and a set of resolutions; one or more processors configured to execute instructions stored on the non-transitory computer-readable storage medium to: receive at the edge node a request for a video segment from a client according to a client ABR algorithm, the request indicating a requested quality; compute a weighted sum score for each of a plurality of qualities based on a quality score and a fairness score suing the ABR algorithm at the edge node, the plurality of qualities including at least the requested quality and another quality; generate a modified request in response to the weighted sum score for the other quality being better than the weighted sum score for the requested quality, the modified request being for a representation of the video segment in the other quality; send the modified request to a server; receive the representation of the video segment in the other quality; and send the representation of the video segment in the other quality to the client. In some examples, the ABR algorithm at the edge node is configured to estimate a future buffer value and to compare the future buffer value with a safe buffer value, for each of the plurality of qualities. In some examples, the client comprises a video playback device.

BRIEF DESCRIPTION OF THE DRAWINGS

Various non-limiting and non-exhaustive aspects and features of the present disclosure are described hereinbelow with references to the drawings, wherein.

Figure 1:
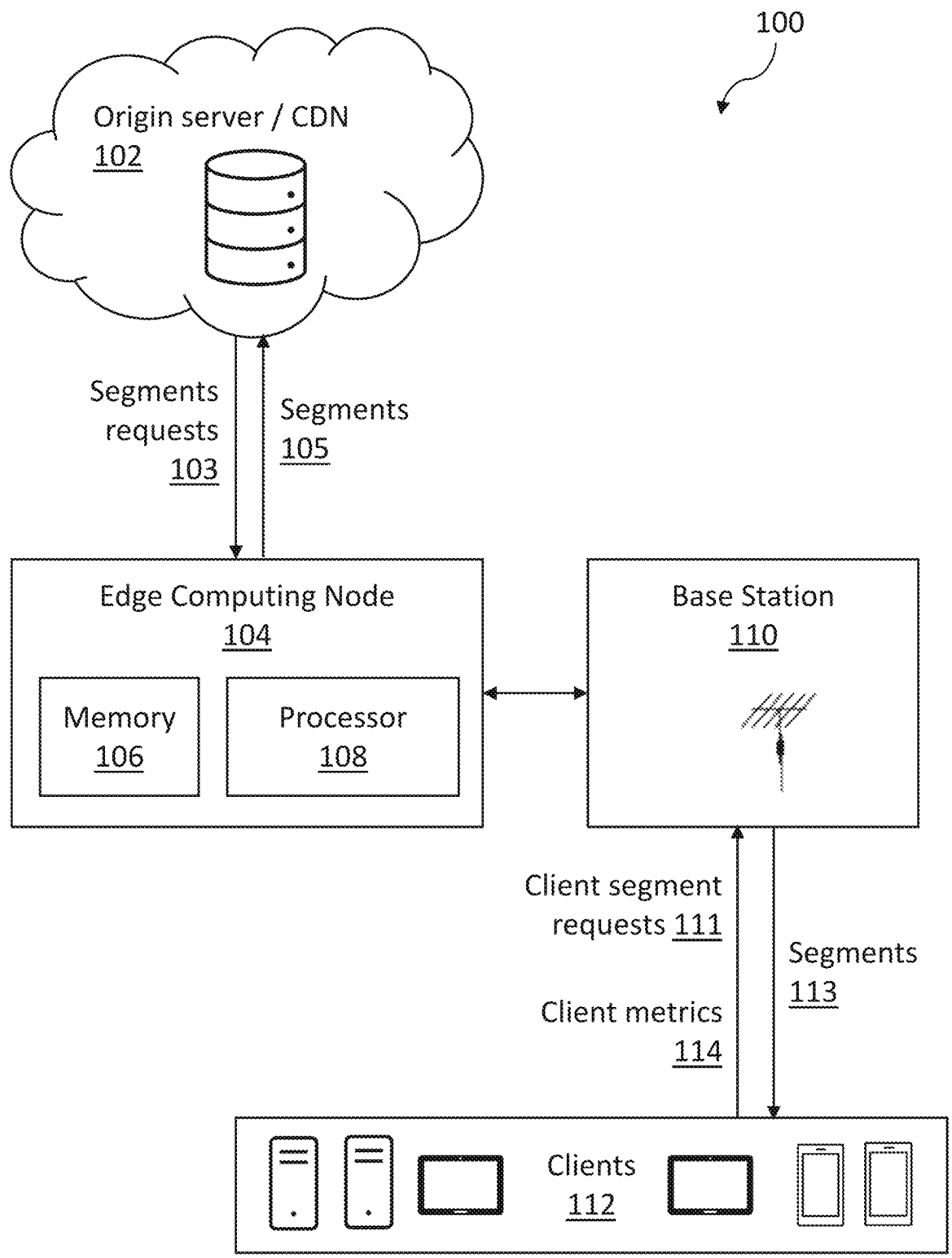
FIG. 1 is a simplified block diagram showing an exemplary system architecture for an on-the-fly adaptive bitrate algorithm deployed at edge nodes, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to an adaptive bitrate algorithm deployed at edge nodes. Edge computing is an emerging paradigm that brings computational power and storage closer to the client. At the edge, we have a better comprehension of the network's present status (e.g., at the time of a video streaming event), access to useful information such as radio link conditions, and are aware of all the clients' requests. This information can be leveraged to assist adaptive bitrate (ABR) algorithms in making better adaptation decisions, improving the overall Quality of Experience (QoE) and fairness among all clients.

The invention includes an on-the-fly ABR algorithm deployed at an edge node (e.g., co-located with the mobile network base station) or at a mobile device, as well as a pre-fetching scheme. The on-the-fly ABR algorithm may be executed as soon as a segment request arrives to serve the client with minimum latency. In some examples, the on-the-fly ABR algorithm is executed once per request. The on-the-fly ABR algorithm does not interfere in the resource allocation process of a base station and does not depend on who is offering the streaming service (e.g., network operator, Over-The-Top (OTT) provider, or other service).

The benefits of the invention over the state of the art improve Quality of Experience ("QoE") as calculated considering bitrate, screen resolution, segment switches, and stalls. Parameters that control the trade-off among bitrate, segment switches, and stalls may include: segment switches penalty, stalls penalty, and two thresholds that divide the buffer into three different risk zones. Machine learning may be used to determine the type of radio trace during the streaming session. A recurrent neural network (RNN) may be trained to categorize radio traces. In some examples, the training may be done using radio trace data from real radio traces. In some examples, for each radio trace category, optimal streaming parameters (e.g., ABR algorithm parameters that maximize the QoE) may be determined using a brute force approach (i.e., exhaustive search to obtain the optimal solution). Parameters, as described herein, may be stored in a database.

An on-the-fly ABR algorithm implemented at edge nodes may support a client-based ABR algorithms, as adaptation decisions by the client-based ABR algorithms can be enhanced (e.g., improved, optimized, otherwise modified) with the extra information available at the edge. The on-the-fly ABR algorithm can leverage a media player's information available at the edge along with storage and computing power capabilities to improve both QoE and fairness. This may be accomplished by using (i) an algorithm that selects a higher or highest segment quality for each client on each request (e.g., to maximize and optimize QoE and/or fairness) and (ii) a segment prefetching technique configured to optimize between performance increase and costs. In some examples, a Python-based testbed that supports real video streaming traffic, real radio network traces, deployment of edge computing mechanisms, and a 4G/5G or other network may be used to implement this approach.

During a streaming session, a machine learning (ML) model may analyze incoming radio traces in a given window (e.g., 5-second intervals, 10-second intervals, up to the length of the whole streaming session) and determine the category of the trace (e.g., radio trace #0, radio trace #15, radio trace #122, or any one or more radio trace categories in between and beyond). In some examples, the incoming radio trace data may be kept in memory for each second, and the radio trace length may increase as the streaming proceeds. Any length of radio trace data may be used by the ML model to make predictions. This enables the selection of optimal streaming parameters for the given radio trace using the pre-constructed database. The ML model may continue to analyze incoming radio traces and to adapt to a different category in order to maintain an optimized QoE. The on-the-fly ABR algorithm may then determine which segment to download next during the streaming session. The proposed method may use an RNN trained to categorize network traces in order to perform optimal decisions at edge nodes for improved QoE and fairness among all clients associated with any given edge node.

Examples Systems

FIG. 1 is a simplified block diagram showing an exemplary system architecture for an on-the-fly adaptive bitrate algorithm deployed at edge nodes, in accordance with one or more embodiments. System 100 includes an origin server 102 configured to store video segments of different videos in different qualities, an edge computing node 104 configured to host an on-the-fly ABR algorithm (e.g., stored in memory 106 and implemented using processor 108), and one or more clients 112. The origin server 102 also is configured to connect to, or comprises, a content delivery network (CDN), which may receive segment requests 103 from edge computing node 104 and serve segments 105 to the edge computing node 104 in response. The on-the-fly ABR algorithm (e.g., Edge Assisted Adaptation Scheme for HTTP Adaptive Video Streaming (EADAS)) at edge computing node 104 also may be configured to receive radio and client metrics 114, as well as receive client segment requests 111 (e.g., directly or through base station 110). In some examples, radio metrics may be received from a Radio Network Information Service (RNIS) co-located with edge computing node 104, RNIS configured to collect Radio Access Network (RAN) metrics. The edge computing node 104 also may be configured to serve clients with increased QoE and fairness among all clients connected to it. The one or more clients 112 may be configured to request segments according to their own client ABR algorithm(s) and to send client metrics 114 (e.g., player and other metrics) to the edge node periodically or in response to an edge node query or request.

An on-the-fly ABR algorithm may be deployed in edge computing node 104 (e.g., an entity located at base station 110 in a cellular network). In some examples, base station 110 may be owned by a mobile network operator (MNO) and opened up to third parties like media streaming service providers. Deploying said on-the-fly algorithm at the edge has several advantages, including: (i) availability of compute power and storage, (ii) awareness of all segment requests from some or all of clients 112, and (iii) close proximity to clients 112, enabling edge computing node 104 to send prefetched and cached segments with reduced latency, merely the latency over the radio link. Edge computing also enables scalability as this scheme can be replicated in different edge computing nodes to support clients of a plurality of base station(s) connected to a plurality of edge computing entities.

As the edge computing node 104 is between the clients 112 and the video (e.g., origin) server 102, an on-the-fly ABR algorithm may intercept and modify the clients' segment requests 111 (e.g., to generate segment requests 103) to improve the content delivery process. Each client has an individual approach when it requests a segment, unaware of what other clients within the same cell (e.g., connected to the base station 110 or to edge computing node 104) are requesting. This lack of awareness can lead to poor fairness among the clients. This issue may be resolved at the edge, where all the clients' requests are received and it is possible to adjust them to improve both QoE and fairness among clients. An on-the-fly ABR algorithm does not substitute the client ABR algorithm running at the client's device, but supports it by improving its segment request decisions, as there is more information available at the edge. In some examples, an on-the-fly ABR algorithm may be designed to be compatible to legacy client-based ABR algorithms. Furthermore, the compute power and storage available at the edge can be leveraged to use segment prefetching techniques that can further increase the QoE of the clients. In some examples, an on-the-fly ABR algorithm may be compatible with different mobile network schedulers without modifying actual resource allocation.

In some examples, an on-the-fly ABR algorithm may be implemented in a plurality of phases. For example, when a client (e.g., one or more of clients 112) issues a segment request, the edge computing node 104 may intercept it and an on-the-fly ABR algorithm (e.g., stored in memory 106 and implemented using processor 108) may be configured to determine the final segment quality to request from the origin server/CDN 102 for the client. An exemplary algorithm may be:

| Algorithm 1: EADAS algorithm |
| --- |
| 1   // This algorithm is executed for each segment request for each client<br>    Data: N, U, quality_weight, $T^{dl}$, B, $B^s$, $R_j$, q<br>    Result: Quality index to request |
| 2   final_score = 0 |
| 3   chosen_quality_index = 0 |
| 4   quality_score_to_beat = 0 |
| 5   if B < $B^s$ then |
| 6   \|   α = 1; |
| 7   \|   // If buffer is under the safe level, we do not consider fairness |
| 8   else |
| 9   ⌊   α = quality_weight; |
| 10  for i = 0, 1, 2, ... N − 1 do |
| 11  \|   // For each quality index |
| 12  \|   if B − $T_i^{dl}$ < $B^s$ then |
| 13  \|   \|   quality_score = 0; |
| 14  \|   \|   // If the buffer will go under the safe level with that quality, its score is the lowest |
| 15  \|   else |
| 16  \|   \|   dev = \|q − i\|; |
| 17  \|   ⌊   quality_score = $1 - \frac{dev}{N}$; |
| 18  \|   fairness_score = $\frac{\sum_{j=0}^{U-1}(R_j)^2}{N \times \sum_{j=0}^{U-1} R_j^2}$; |
| 19  \|   // Jain's fairness index determines the fairness score.<br>    \|   For the current user, $R_j$ is the bitrate of the quality<br>    \|   index we are evaluating (i) |
| 20  \|   final_score =<br>    \|   α × quality_score + (1 − a) × fairness_score ; |
| 21  \|   if final_score > quality_score_to_beat then |
| 22  \|   \|   chosen_quality_index = i ; |
| 23  ⌊   ⌊   quality_score_to_beat = final_score ; |
| 24  return chosen_quality_index ; | wherein:

| Symbol | Definition |
| --- | --- |
| N | Number of quality representations |
| U | Number of clients in the current client's cluster |
| q | Quality index requested by the ABR algorithm |
| α | Weight of quality factor |
| $T_i^{dl}$ | Estimated download time for quality index i (s) |
| B | Current buffer level of the current client (s) |
| $B^s$ | Safe buffer level (s) |
| $R_j$ | Last segment bitrate for client j (kbps) |

A quality weighting factor (a) may be implemented to manage the trade-off between quality and fairness. Improving fairness among clients may lead to a degradation of a specific client's quality as the segment requests are not chosen to prioritize the individual quality but also to reduce quality differences among clients. The value a may represent the weight of the quality score in an on-the-fly ABR algorithm and depends on preferences of the service provider. For example, to prioritize quality, higher values may be assigned to $\alpha$. On the other hand, to prioritize fairness, lower values may be assigned to $\alpha$.

In an example, in a first phase, the client's buffer may be checked to determine whether it is under a safe buffer level (e.g., lines 5-9 in Algorithm 1 above). This may occur at the beginning of a video streaming session, when the buffer is filling, and/or during a video streaming session. If the client's buffer is under the safe buffer level, the on-the-fly ABR algorithm may request the same quality that the client ABR algorithm requested. However, if the client's buffer is above the safe buffer level, $\alpha$ may be given an appropriate quality weight value, depending on desired quality and fairness. In a second phase, a quality index may be chosen based on various inputs by iterating over all quality representations (e.g., lines 10-23 in Algorithm 1 above). In this phase, a quality score may be determined including evaluating if a given quality index may cause a stall by estimating a future buffer value $(B-T_i^{dl})$ and comparing it with the safe buffer level $(B^s)$ (e.g., lines 11-17 in Algorithm 1 above). If it would go under the safe buffer level, a lowest quality score is given. Otherwise, a quality score may be calculated. The difference of the quality index may be determined by the quality index requested by the client ABR algorithm (q) and the quality index being evaluated. The higher the difference between those qualities, the lower the quality score determined by the on-the-fly ABR algorithm. Also in this second phase, a fairness index may be calculated among the bitrates of the last segments requested by the clients in the same cluster (i.e., group of clients with the same characteristics who should experience fairness among them) (e.g., lines 18-20 in Algorithm 1 above). For a current user, a final (i.e., weighted sum) score may be calculated as a weighted sum of quality_score and fairness_score using the weight factor $\alpha$. Considering the bitrate of the quality being evaluated, the on-the-fly ABR algorithm may assume there is no significant difference in screen (i.e., display) properties among the clients, as the same bitrate results in a different QoE depending on the display. It also may assume that all clients have the same QoS Class Identifier (QCI), as they are using video streaming service. Further in this second phase, the chosen (i.e., requested) quality index may be updated if the final score for that quality is better than the final score to beat (e.g., lines 21-23 in Algorithm 1 above).

Figure 2:
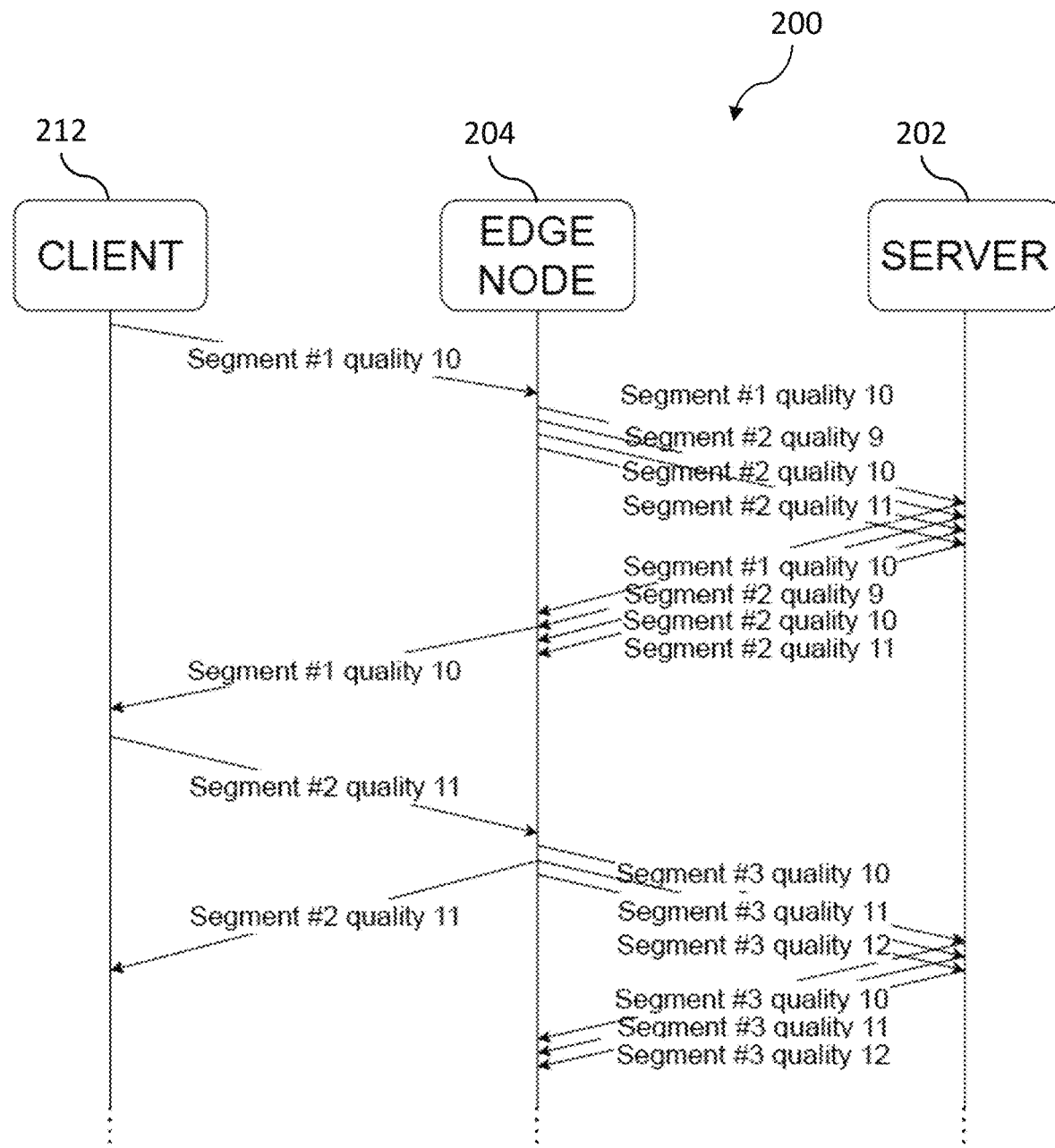
FIG. 2 is a flow diagram showing an exemplary segment prefetch policy, in accordance with one or more embodiments.

FIG. 2 is a flow diagram showing an exemplary segment prefetch policy, in accordance with one or more embodiments. An on-the-fly ABR algorithm is capable of performing segment prefetching using the capabilities of the edge computing node. In diagram 200, prefetching makes segments available at edge node 204 prior to client(s) 212 requesting them, which can improve both latency and quality. Examples of segment prefetching policies may be include:

1) Last segment quality (LSQ)—LSQ policy causes edge node 204 to prefetch the same quality as in the last segment request. ABR algorithms tend to minimize the number of quality switches as those reduce the QoE. This approach is suitable in stable network scenarios with no or reduced quality switches.

2) Last segment quality plus (LSQ+)—This approach is a minor variation of the LSQ policy where the edge node 204 prefetches the same quality as in the last segment request and two (or more) additional segments (e.g., of higher and lower quality levels). This policy may be implemented where quality variations are mostly within one quality level higher or lower. LSQ+ provides a good trade-off to match (e.g., minor) network variations while at the same time reducing the bandwidth between the server and edge node 204 or/and storage needs. LSQ+ may be less useful in unstable environments with a high amplitude of segment switches.

3) All segment qualities (ASQ)—ASQ policy causes edge node 204 to prefetch all available quality levels for the next segment. ASQ enables high QoE, but significantly increases both server—edge bandwidth (e.g., between server 202 and edge node 204) and edge storage requirements. It is suitable when most clients request segments from the same (e.g., few, set of) videos.

Other prefetching policies may consider actual client 212 capabilities (e.g., maximum resolution of the requesting device), network bandwidth, computing power, storage available at edge computing node 204, and also may perform lightweight transrating operations on prefetched segments (e.g., prefetch high-quality segments and transrate them to lower bitrates). Finally, predicting the next segment quality to be prefetched based on various information available at the edge (e.g., client ABR algorithm, throughput, buffer status, etc.) also may be an effective prefetching policy.

FIG. 2 shows a simplified exemplary sequence diagram of LSQ+ (e.g., manifest request/response handling is omitted for simplicity). Client 212 requests a segment (#1) of a certain quality determined by its ABR algorithm. This request is intercepted by edge node 204. If this is the first request and edge node 204 did not yet prefetch any segment, edge node 204 requests it from server 202 and serves it immediately to client 212. Additionally, edge node 204 requests the next segment (#2) from server 202 in three different qualities: the same quality level as in the previous request, plus one quality higher and one lower. This is repeated for future requests allowing for flexibility with respect to minor bandwidth variations and, thus, reducing latency.

Service providers may want to offer different levels of subscriptions to offer several pricing schemes (e.g., basic, premium) to customers with differentiated services, e.g., in terms of QoE. For example, premium clients may benefit from ASQ while regular clients are served with LSQ or with segment prefetching disabled. An on-the-fly ABR algorithm may provide better performance to clients with higher subscription levels. Moreover, at the edge it is possible to group users with the same characteristics and assure fairness among them. For example, clients may be grouped with the same subscription level into clusters. Fairness among the users within the same cluster may be assured by the on-the-fly ABR algorithm, enabling better performance for premium clients.

In an example, a simulator that supports video streaming traffic, deployment of edge mechanisms, and a 4G/5G network traces, may be implemented to test an on-the-fly ABR algorithm. The simulator may include a video streaming server, an edge computing node co-located with a base station, and multiple clients (e.g., system 100 in FIG. 1, server 202, edge node 204, and client 212 in FIG. 2).

In an example, radio traces may be imported from a 4G radio dataset to our testbed. Clients may follow a pedestrian mobility pattern, each client using different individual radio traces available in the dataset for the chosen mobility pattern. A dataset may offer different traces for each mobility pattern. The traces are assigned in the order of their appearance in the dataset (i.e., the first client uses the first radio trace, the second client uses the second radio trace, etc.). If the number of clients (e.g., clients 112, clients 212) is higher than the number of traces, radio traces are repeated in order. For the backhaul link that connects a video server (e.g., origin server 102, server 202) and an edge computing node (e.g., edge computing node 104, edge node 204), a given Gbps bandwidth and ms of latency may be assumed. Segment lengths of two seconds, or more or less, may be used, along with bitrates levels in a range of 50-8000 kbps in resolutions ranging from 320×240 to 1920×1080. Video selection may be equally distributed (e.g., an equal or similar number of the clients watches each video). The clients may start and finish playing the content simultaneously. The on-the-fly ABR algorithm may make the adaptation decision in each player. Client-based adaptation algorithms may follow one or more of the three different main approaches: (i) throughput-based ABR, (ii) buffer-based ABR, and (iii) hybrid-based ABR (e.g., segment aware rate a adaptation—aka SARA). These three ABR algorithms consider different parameters to perform the adaptation decisions, such as throughput, buffer status, last segment request, among others.

A test bed may allow the deployment and testing of different mechanisms that assist video content delivery, as it has storage and compute power available, radio metrics from the Radio Network Information Service (RNIS), and all the clients' segment requests. Furthermore, player metrics such as buffer occupancy, among other quality metrics, may be available at the edge node. These metrics may be reported (e.g., periodically, ad hoc, or by request) to the edge node by the clients using the HTTP POST protocol. The final media session QoE may be determined by the recommendation ITU-T P.1203, generating the metadata suitable for the ITU-T P.1203 mode 0 QoE evaluation.

Figure 3:
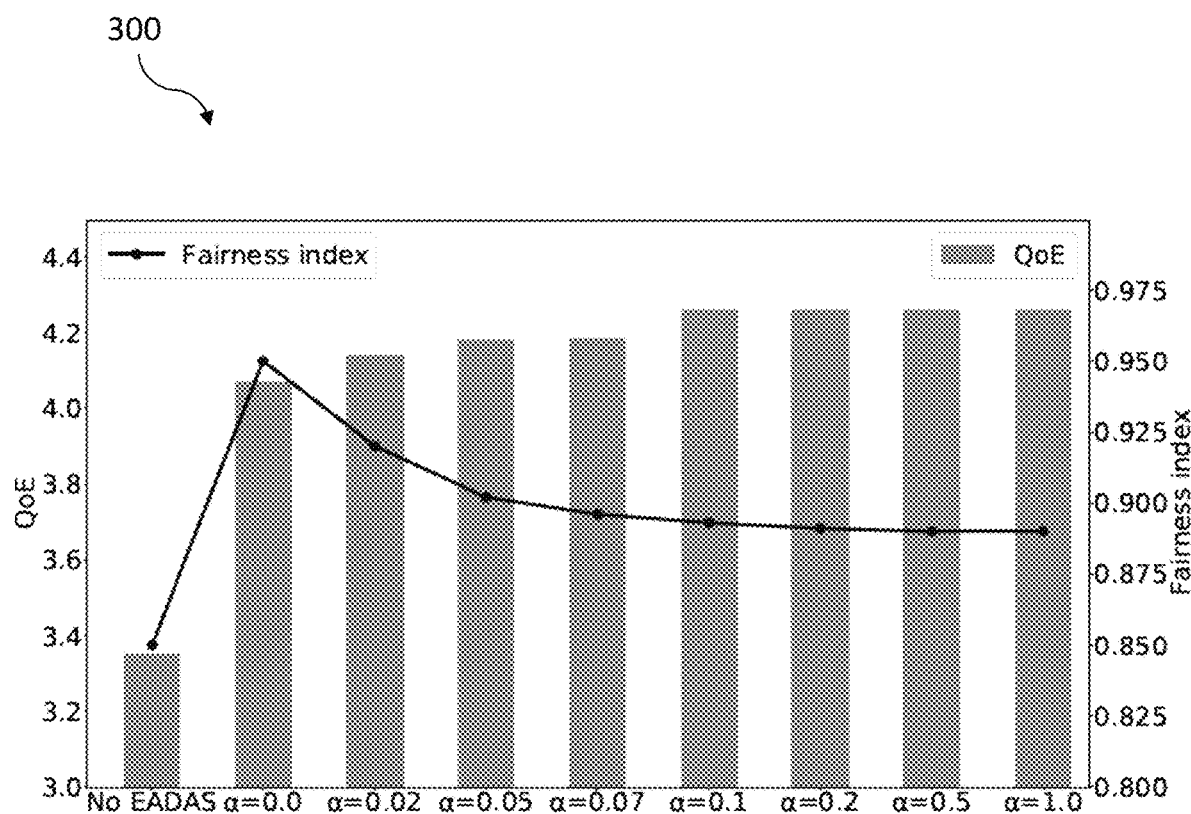
FIG. 3 is a chart showing exemplary QoE and fairness index results when implementing an on-the-fly adaptive bitrate algorithm deployed at edge nodes in conjunction with an exemplary client ABR algorithm, in accordance with one or more embodiments.

FIG. 3 is a chart showing exemplary QoE and fairness index results when implementing an on-the-fly adaptive bitrate algorithm deployed at edge nodes in conjunction with an exemplary client ABR algorithm, in accordance with one or more embodiments. As shown in chart 300, the average QoE and fairness index of the clients for different values of a during a video streaming session using a client ABR algorithm (e.g., SARA) supported by an on-the-fly ABR algorithm (e.g., EADAS) achieves better performance in both QoE and fairness than without the on-the-fly ABR algorithm.

Figure 4A:
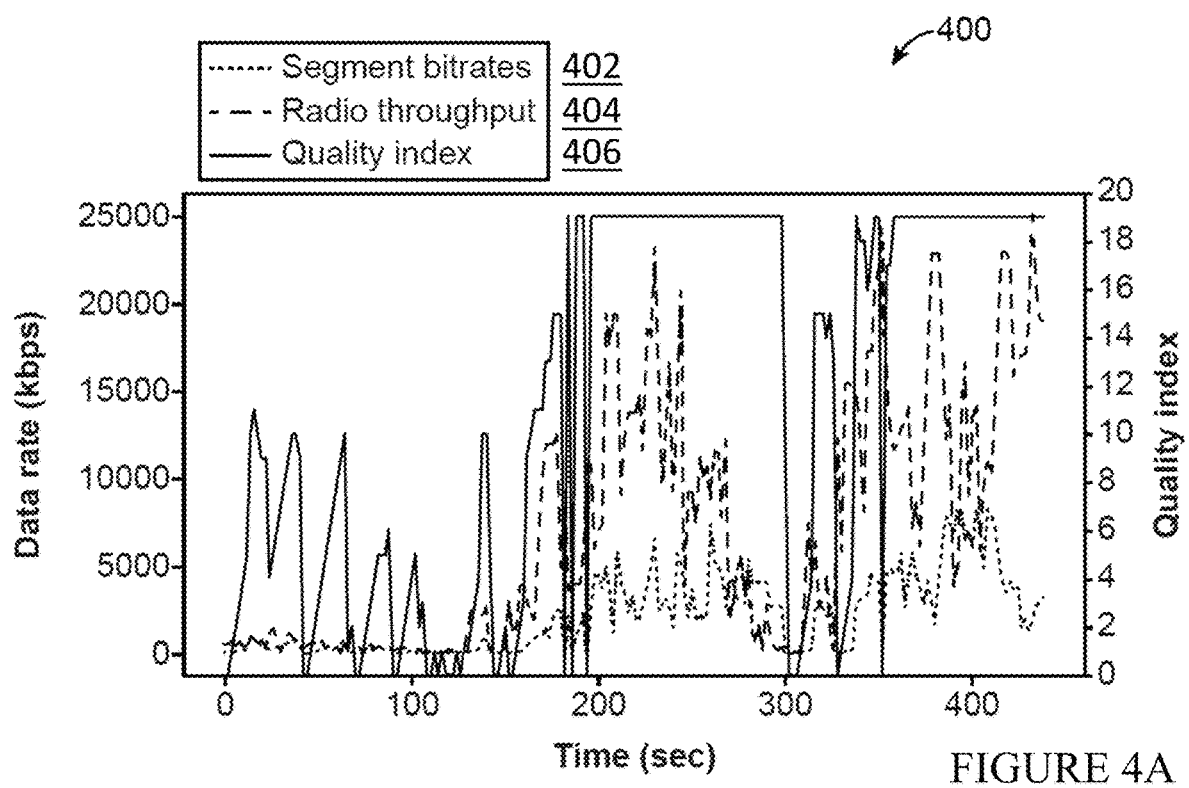
FIG. 4A is chart showing performance of an exemplary prior art client ABR algorithm on its own, in accordance with one or more embodiments.
Figure 4B:
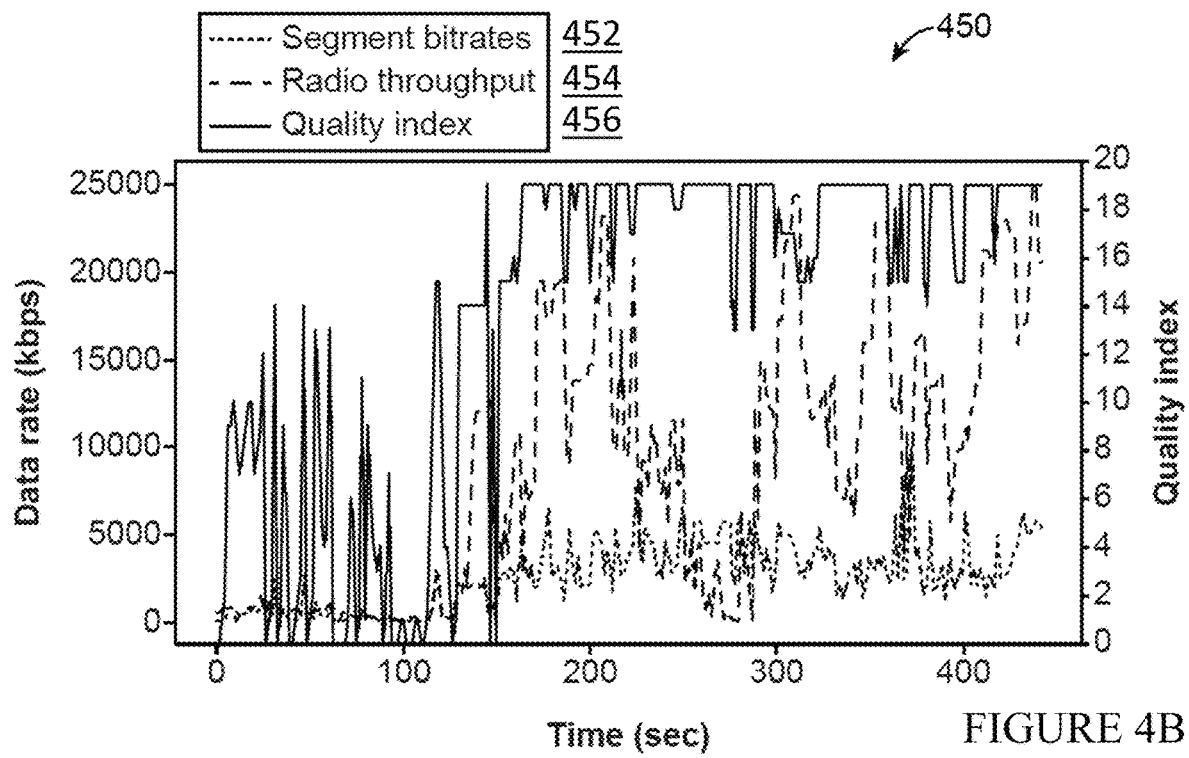
FIG. 4B is a chart showing performance of an on-the-fly adaptive bitrate algorithm deployed at edge nodes in conjunction with the prior art client ABR algorithm, in accordance with one or more embodiments.

FIG. 4A is chart showing performance of an exemplary prior art client ABR algorithm on its own, in accordance with one or more embodiments. FIG. 4B is a chart showing performance of an on-the-fly adaptive bitrate algorithm deployed at edge nodes in conjunction with the prior art client ABR algorithm, in accordance with one or more embodiments. Segment bitrates, radio throughput, and selected quality index during a video streaming session of one client is shown with (in FIG. 4B) and without (in FIG. 4A) an on-the-fly ABR algorithm. The on-the-fly ABR algorithm improves the mean quality index (shown by solid lines 406 and 456 in FIGS. 4A-4B) and mean segment bitrate (shown by dotted lines 402 and 452 in FIGS. 4A-4B), thereby better leveraging the network throughput (shown by dashed lines 404 and 454 in FIGS. 4A-4B). The on-the-fly ABR algorithm also may consider the buffer levels to avoid being too aggressive in terms of segment requests, which can lead to future stalls. Moreover, the on-the-fly ABR algorithm may prevent stalls and drops in segment quality when the radio throughput decreases suddenly (e.g., as shown between seconds 200 and 400).

Example Methods

Figure 5A:
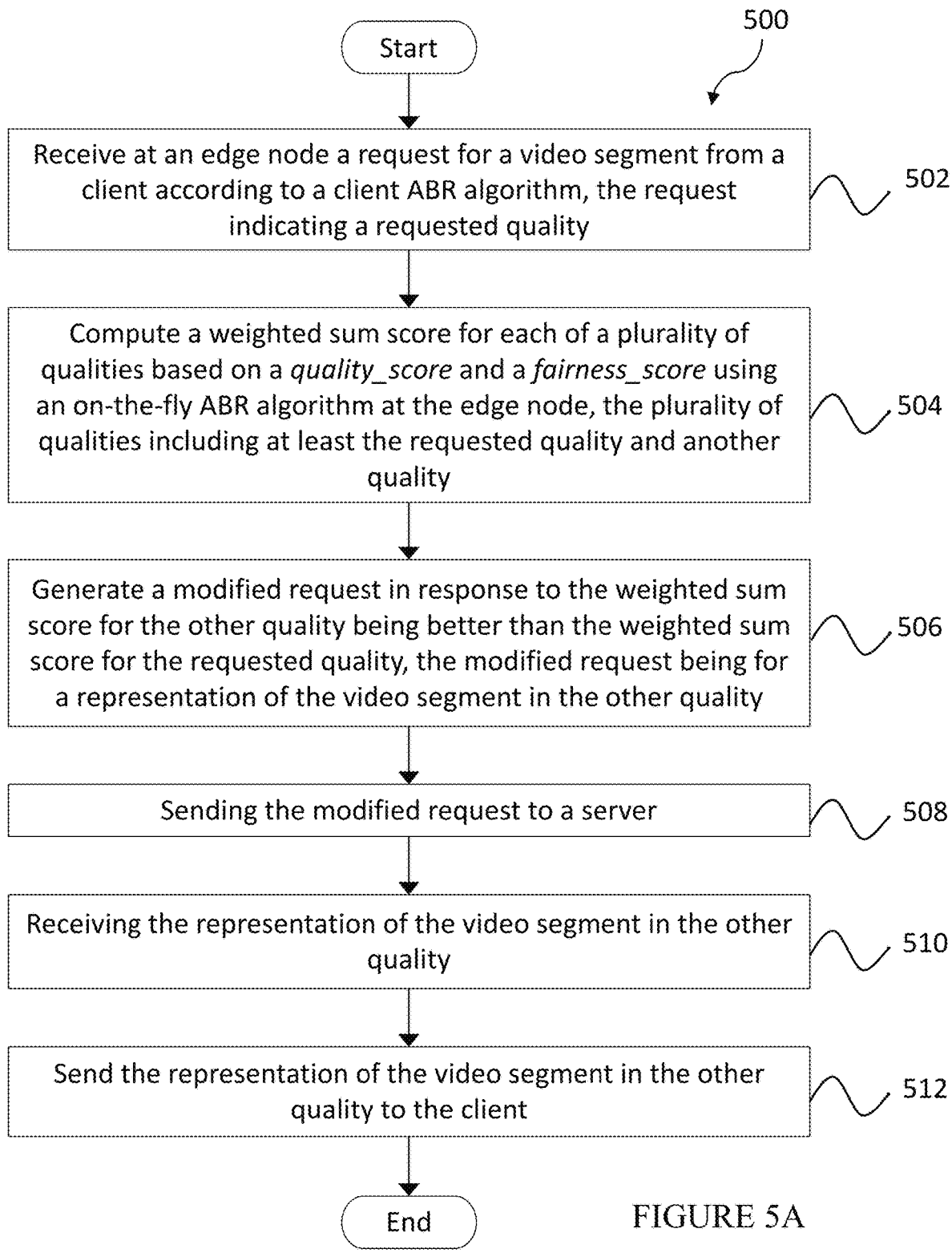
FIGS. 5A-5B are flow diagrams illustrating exemplary methods for deploying an on-the-fly adaptive bitrate algorithm at edge nodes, in accordance with one or more embodiments.
Figure 5B:
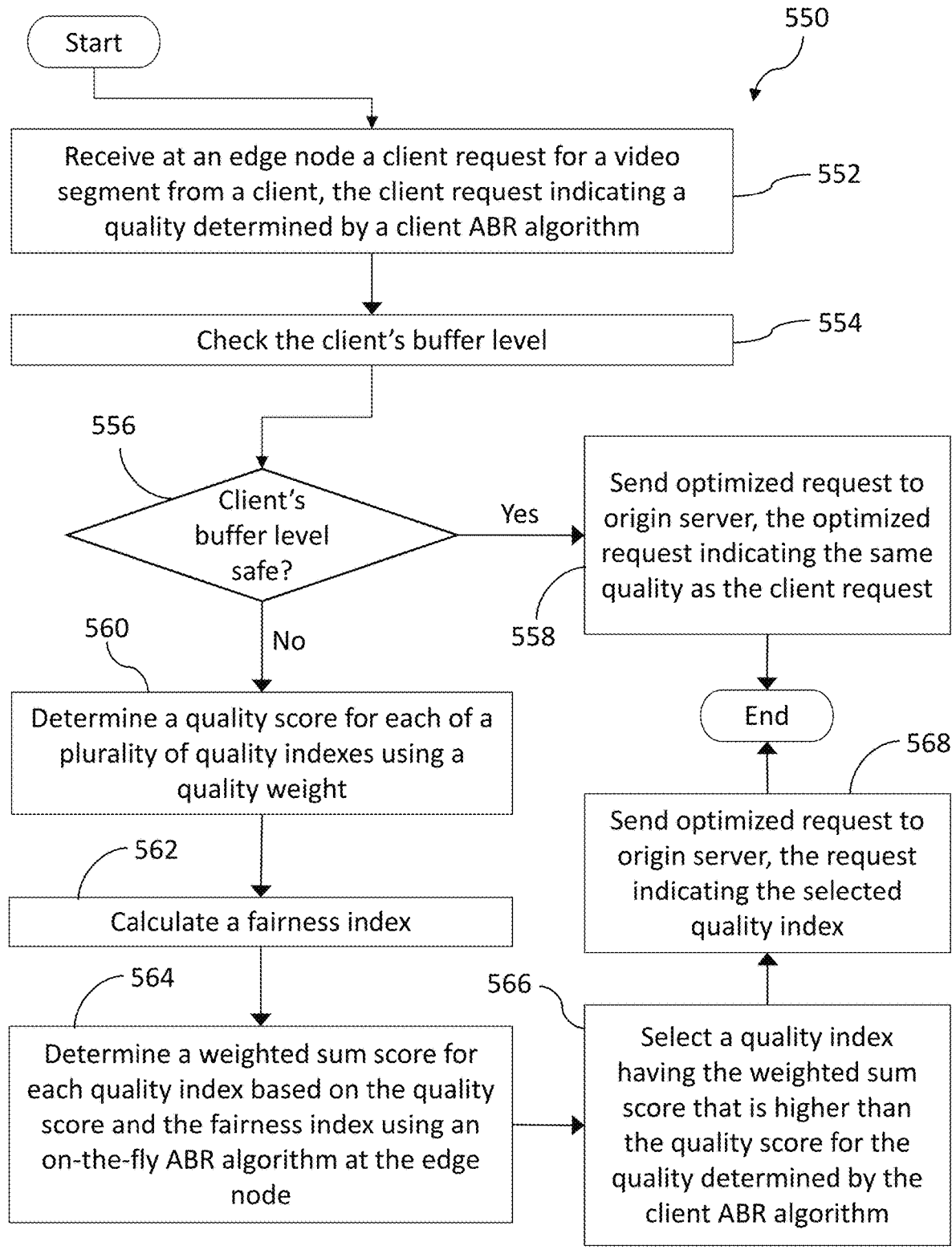

FIGS. 5A-5B are flow diagrams illustrating exemplary methods for deploying an on-the-fly adaptive bitrate algorithm at edge nodes, in accordance with one or more embodiments. In FIG. 5A, method 500 begins with receiving a request at an edge node for a video segment from a client according to a client ABR algorithm at step 502, the request indicating a requested quality. A weighted sum score for each of a plurality of qualities may be computed based on a quality_score and fairness_score using an on-the-fly ABR algorithm at the edge node at step 504, the plurality of qualities including at least the requested quality and another quality. A modified request may be generated in response to the weighted sum score for the other quality being better than the weighted sum score for the requested quality, at step 506, the modified request being for a representation of the video segment in the other quality. The modified request may be sent to a server at step 508. A representation of the video segment in the other quality may be received at step 510, in response to the modified request. The representation of the video segment in the other quality may be sent to the client at step 512.

In FIG. 5B, method 550 begins with receiving at an edge node a client request for a video segment from a client, at step 552, the client request indicating a quality determined by a client ABR algorithm. The client's buffer level may be checked at step 554, for example, at the beginning of a client's video streaming session when a buffer is filling or at other times during a client video streaming session. At decision 556, if the client's buffer level is safe (e.g., under a safe buffer threshold), then an optimized request to an origin server is sent at step 558, the optimized request indicating the same quality as the client request. However, at decision 556, if the client's buffer level is not safe (e.g., above a safe buffer level), then a quality score for each of a plurality of quality indexes may be determined at step 560 using a quality weight (e.g., quality weighting factor ∝, as described herein). The quality weight may be predetermined depending on desired quality and fairness (e.g., a higher quality weight may be assigned to prioritize quality, a lower quality weight may be assigned to prioritize fairness). A fairness index may be calculated at step 562, for example using the bitrates of the last segments requested by clients in a group or cluster (e.g., clients with the same characteristics and/or predetermined level of service). A weighted sum score for each quality index may be determined at step 564 based on the quality score and the fairness index using an on-the-fly ABR algorithm at the edge node. A quality index may be selected at step 566, the quality index having the weighted sum score that is higher than the quality score for the quality determined by the client ABR algorithm. An optimized request may be sent to an origin server at step 568, the request indicating the selected quality index.

In some examples, a representation of the video segment having a quality or quality index indicated in the optimized request may be received by the edge node from a server (e.g., video server, origin server, or other servers as described herein), and provided to the client. In some examples, the edge node also may prefetch a next video segment in the same quality with or without a quality above and/or below. In some examples, the edge node further may prefetch the next video segment in a plurality of qualities.

Example Computing Systems

Figure 6A:
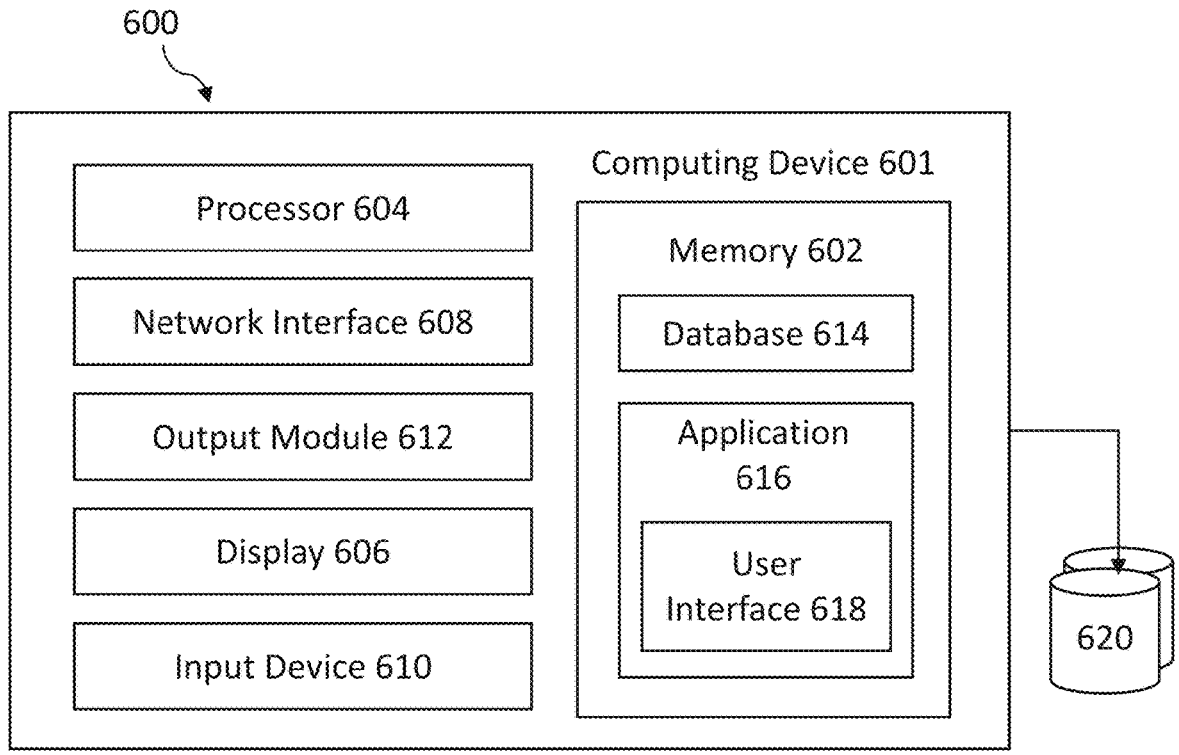
FIG. 6A is a simplified block diagram of an exemplary computing system configured to implement the architecture and policy illustrated in FIGS. 1-2 and perform steps of the method illustrated in FIGS. 5A-5B, in accordance with one or more embodiments.

FIG. 6A is a simplified block diagram of an exemplary computing system configured to implement the architecture and policy illustrated in FIGS. 1-2 and perform steps of the method illustrated in FIGS. 5A-5B, in accordance with one or more embodiments. In one embodiment, computing system 600 may include computing device 601 and storage system 620. Storage system 620 may comprise a plurality of repositories and/or other forms of data storage, and it also may be in communication with computing device 601. In another embodiment, storage system 620, which may comprise a plurality of repositories, may be housed in one or more of computing device 601. In some examples, storage system 620 may store networks, video data, bitrate ladders, metadata, instructions, programs, and other various types of information as described herein. This information may be retrieved or otherwise accessed by one or more computing devices, such as computing device 601, in order to perform some or all of the features described herein. Storage system 620 may comprise any type of computer storage, such as a hard drive, memory card, ROM, RAM, DVD, CD-ROM, write-capable, and read-only memories. In addition, storage system 620 may include a distributed storage system where data is stored on a plurality of different storage devices, which may be physically located at the same or different geographic locations (e.g., in a distributed computing system such as system 650 in FIG. 6B). Storage system 620 may be networked to computing device 601 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 601, which in some examples may be included in a mobile device (e.g., one or more of clients 112 and 212) and in other examples may be included in a server (e.g., server 102 and 202, and other servers described herein), also may include a memory 602. Memory 602 may comprise a storage system configured to store a database 614 and an application 616. Application 616 may include instructions which, when executed by a processor 604, cause computing device 601 to perform various steps and/or functions (e.g., implementing an on-the-fly ABR algorithm, requesting and prefetching video segments, fielding client requests), as described herein. Application 616 further includes instructions for generating a user interface 618 (e.g., graphical user interface (GUI)). Database 614 may store various algorithms and/or data, including neural networks (e.g., convolutional neural networks) and data regarding bitrates, videos, device characteristics, network performance, among other types of data. Memory 602 may include any non-transitory computer-readable storage medium for storing data and/or software that is executable by processor 604, and/or any other medium which may be used to store information that may be accessed by processor 604 to control the operation of computing device 601.

Computing device 601 may further include a display 606, a network interface 608, an input device 610, and/or an output module 612. Display 606 may be any display device by means of which computing device 601 may output and/or display data. Network interface 608 may be configured to connect to a network using any of the wired and wireless short range communication protocols described above, as well as a cellular data network, a satellite network, free space optical network and/or the Internet. Input device 610 may be a mouse, keyboard, touch screen, voice interface, and/or any or other hand-held controller or device or interface by means of which a user may interact with computing device 601. Output module 612 may be a bus, port, and/or other interfaces by means of which computing device 601 may connect to and/or output data to other devices and/or peripherals.

In one embodiment, computing device 601 is a data center or other control facility (e.g., configured to run a distributed computing system as described herein), and may communicate with a media playback device (e.g., one or more of clients 112 and 212). As described herein, system 600, and particularly computing device 601, may be used for video playback, running an application, requesting and prefetching video, communicating with a server and/or a client, and otherwise implementing steps in a implementing an ABR algorithm at an edge node, as described herein. Various configurations of system 600 are envisioned, and various steps and/or functions of the processes described below may be shared among the various devices of system 600 or may be assigned to specific devices.

Figure 6B:
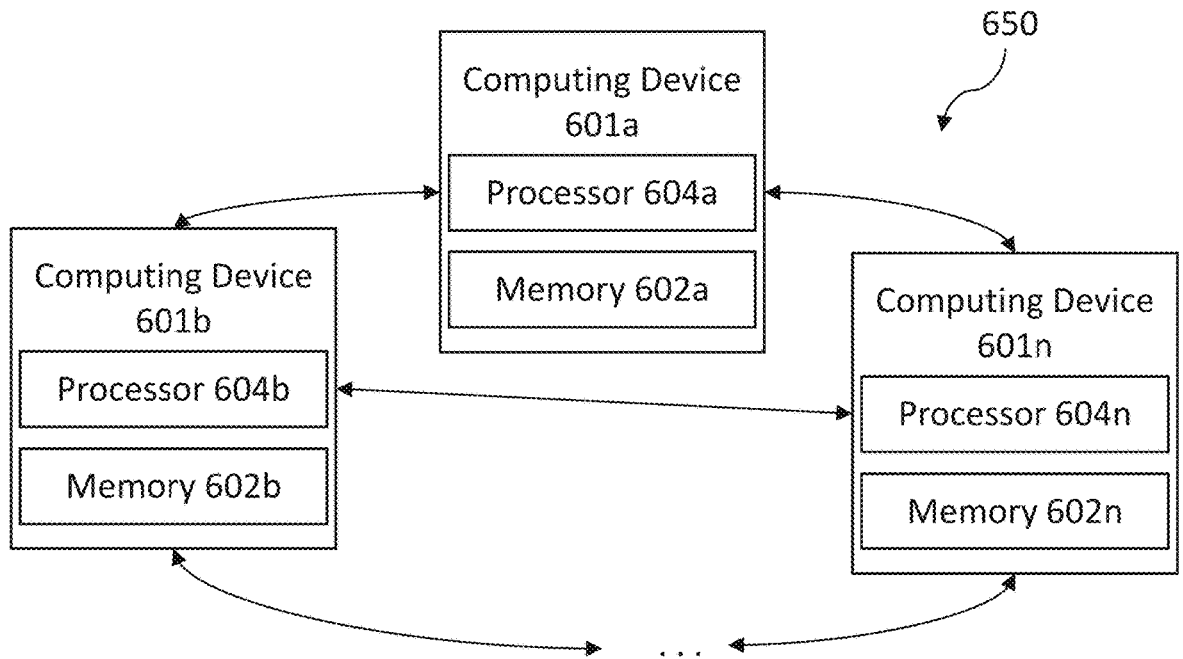
FIG. 6B is a simplified block diagram of an exemplary distributed computing system implemented by a plurality of the computing devices, in accordance with one or more embodiments.

FIG. 6B is a simplified block diagram of an exemplary distributed computing system implemented by a plurality of the computing devices, in accordance with one or more embodiments. System 650 may comprise two or more computing devices 601a-n. In some examples, each of 601a-n may comprise one or more of processors 604a-n, respectively, and one or more of memory 602a-n, respectively. Processors 604a-n may function similarly to processor 604 in FIG. 6A, as described above. Memory 602a-n may function similarly to memory 602 in FIG. 6A, as described above.

In the description above, the terms "quality" and "quality index" are both used to refer to a quality level associated with a video, video segment, or representation thereof.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for implementing an adaptive bitrate (ABR) algorithm at an edge node, comprising:
   receiving at the edge node a request for a video segment from a client according to a client ABR algorithm, the request indicating a requested quality;
   computing a weighted sum score for each of a plurality of qualities based on a quality score and a fairness index using the ABR algorithm at the edge node, the plurality of qualities including at least the requested quality and an other quality;
   generating a modified request in response to the weighted sum score for the other quality being better than the weighted sum score for the requested quality, the modified request being for a representation of the video segment in the other quality; and
   sending the modified request to a server.

2. The method of claim 1, further comprising prefetching from the server a next video segment in two or more qualities.

3. The method of claim 2, wherein the two or more qualities comprise a quality above the other quality and a quality below the other quality.

4. The method in claim 1, wherein the quality score is based on a quality weighting factor, the quality weighting factor predetermined based on a desired quality and desired fairness.

5. The method of claim 4, wherein the quality weighting factor is higher if the desired quality is greater than the desired fairness.

6. The method of claim 4, wherein the quality weighting factor is lower if the desired fairness is greater than the desired quality.

7. The method of claim 1, wherein the server is configured to connect to a content delivery network, the content delivery network configured to receive the modified request from, and provide the video segment to, the edge node.

8. The method of claim 1, wherein computing the weighted sum score comprises the ABR algorithm at the edge node estimating a future buffer value and to compare the future buffer value with a safe buffer value for each of the plurality of qualities.

9. The method of claim 1, wherein the fairness index represents a desired fairness level for a group of clients, the group of clients having similar characteristics.

10. The method of claim 1, further comprising receiving the representation of the video segment in the other quality.

11. The method of claim 1, further comprising sending the representation of the video segment in the other quality to the client.

12. The method of claim 1, further comprising checking the client's buffer.

13. The method of claim 1, wherein the client comprises a media playback device.

14. The method of claim 1, wherein the client is a mobile device.

15. A system for implementing an adaptive bitrate (ABR) algorithm at an edge node, comprising:
   a memory comprising non-transitory computer-readable storage medium configured to store at least a set of bitrates and a set of resolutions;
   one or more processors configured to execute instructions stored on the non-transitory computer-readable storage medium to:
   receive at the edge node a request for a video segment from a client according to a client ABR algorithm, the request indicating a requested quality;
   compute a weighted sum score for each of a plurality of qualities based on a quality score and a fairness index using the ABR algorithm at the edge node, the plurality of qualities including at least the requested quality and an other quality;
   generate a modified request in response to the weighted sum score for the other quality being better than the weighted sum score for the requested quality, the modified request being for a representation of the video segment in the other quality;
   send the modified request to a server;
   receive the representation of the video segment in the other quality; and
   send the representation of the video segment in the other quality to the client.

16. The system of claim 15, wherein the ABR algorithm at the edge node is configured to estimate a future buffer value and to compare the future buffer value with a safe buffer value, for each of the plurality of qualities.

17. The system of claim 15, further wherein the client comprises a video playback device.

* * * * *